United States Patent [19]

Barksdale

[11] Patent Number: 4,623,054
[45] Date of Patent: Nov. 18, 1986

[54] DUAL REVERSED CONE SYNCHRONIZING CLUTCH

[75] Inventor: John S. Barksdale, Ypsilanti, Mich.

[73] Assignee: Ford Motor Company, Dearborn, Mich.

[21] Appl. No.: 695,769

[22] Filed: Jan. 28, 1985

[51] Int. Cl.[4] ............................................. F16D 23/06
[52] U.S. Cl. .................................................... 192/53 E
[58] Field of Search ............................ 192/53 E, 53 F

[56] References Cited

U.S. PATENT DOCUMENTS

| | | |
|---|---|---|
| 2,035,507 | 3/1936 | Robbins . |
| 2,395,189 | 2/1946 | Lapsley et al. . |
| 2,410,511 | 11/1946 | Letsinger et al. . |
| 2,479,184 | 8/1949 | Peterson et al. . |
| 2,635,478 | 4/1953 | Wolfe . |
| 2,930,462 | 3/1960 | Willis . |
| 3,286,801 | 11/1966 | Wojcikowski ............... 192/53 E |
| 3,451,513 | 6/1969 | Altmann . |
| 3,552,531 | 1/1971 | Grosseau . |
| 3,804,218 | 4/1974 | Krutashov ............... 192/53 F |
| 3,861,509 | 1/1975 | Inoue et al. . |
| 4,125,179 | 11/1978 | Cochran et al. ............ 192/53 E |
| 4,138,007 | 2/1979 | Wakabayashi . |
| 4,141,440 | 2/1979 | Richards . |
| 4,280,370 | 7/1981 | Schreiner . |

*Primary Examiner*—George H. Krizmanich
*Attorney, Agent, or Firm*—Frank G. McKenzie; Donald J. Harrington

[57] ABSTRACT

A dual cone pin type synchronizing clutch for driveably connecting to a shaft gear wheels journalled on the shaft includes a hub splined to the shaft, a clutch sleeve connected to the hub through spline teeth that permit axial displacement of the sleeve into engagement with clutching teeth formed with the gear wheel. Each gear wheel carries a cone element engageable with a conical friction surface that is fixed to the gear wheels. A cone arm assembly carries cone members adapted to engage frictionally an intermediate cone member when the sleeve is displaced. The frictional contact between the cone elements, which engage before the clutching teeth engage, operate to synchronize the speed of the gear wheels to that of the synchronizer hub. The sleeve defines a space within which a detent spring is trapped and forced radially outward against the inner surface of the cone arm assembly, when the sleeve is displaced from the neutral position, or into a detent groove, when the clutch sleeve returns to the neutral position.

5 Claims, 1 Drawing Figure

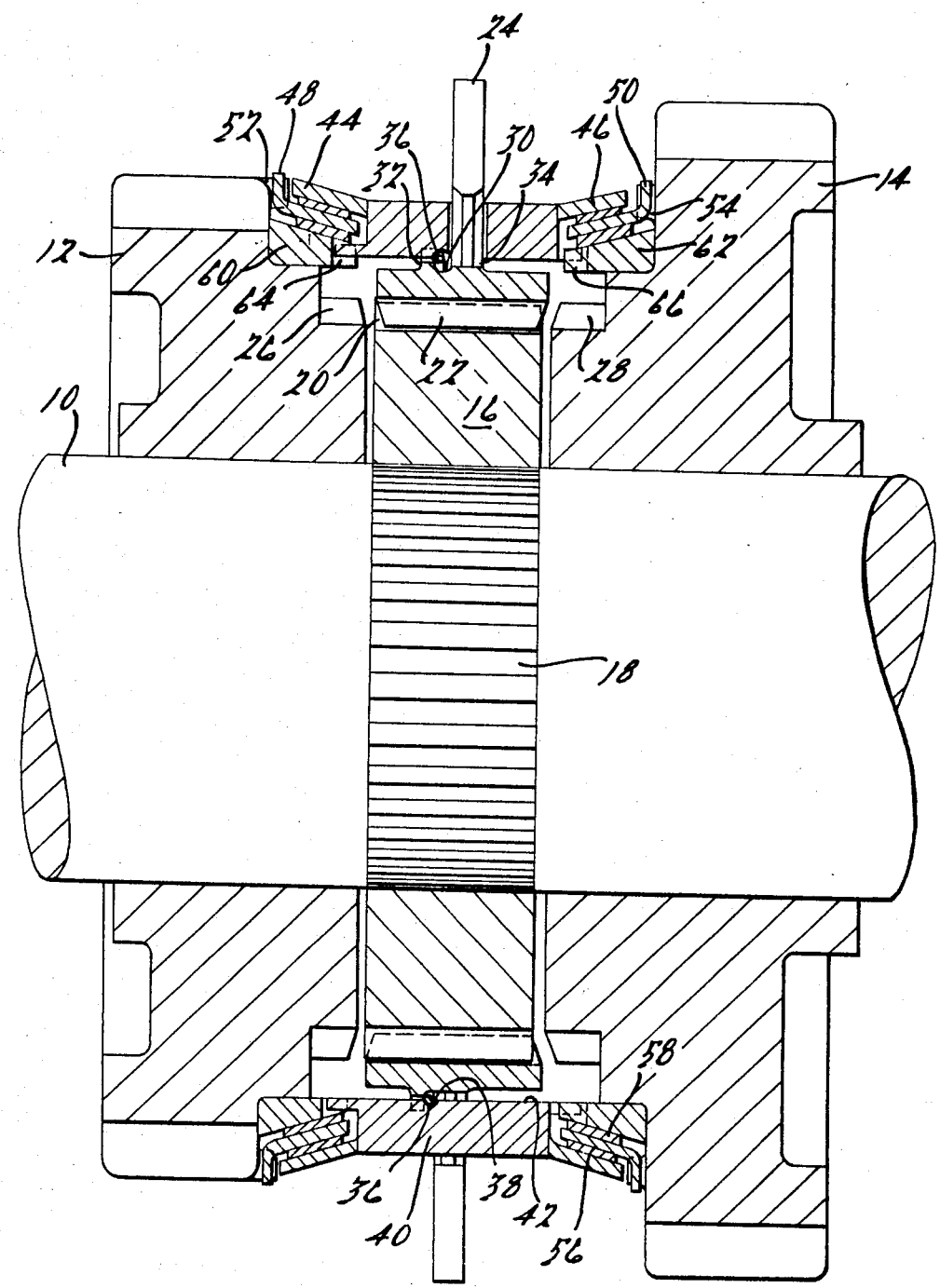

DUAL REVERSED CONE SYNCHRONIZING CLUTCH

BACKGROUND OF THE INVENTION

1. Field of the Invention

This invention relates to a cone-pin type blocking synchronizer for a multiple speed manual transmission More particularly, the invention pertains to such a synchronizer having multiple conical friction elements for synchronizing the speeds of a shaft and a gear wheel before clutch engagement.

2. Description of the Prior Art

Automotive manual transmissions currently use synchronizing clutches to make gear changes. These synchronizing clutches usually employ frictional engagement between the synchronizer and the gear to be engaged when the speeds of these components are asynchronous, the frictional connection continuing until synchronization occurs. After the speeds are made synchronous, the components are driveably connected through positive mechanical means.

Usually the frictional engagement is made when a conical friction surface is forced by the vehicle operator into contact with a complimentary conical friction surface fixed to one of the gear wheels. The gear wheel is connected through the synchronizer to the shaft on which it is journalled after synchronization by moving spline teeth on the clutch sleeve into engagement with clutching teeth on the gear wheel.

High torque capacity engines require large neutral clutches whose components, which have large polar moments of inertia, are fixed to the engine shaft and input shaft of the transmission. When gear shifts are made, the rotating inertia of these components requires that a large torque be applied to the gear wheel while its speed is synchronized with that of the output shaft or the countershaft of the transmission and before a mechanical connection is made by the synchronizing clutch. This inertial torque must be accomodated in the synchronizing clutch in a relatively small space provided between the gear wheels on the shaft to which the synchronizer driveably connects the gear wheels. Large vehicles, particularly heavily loaded trucks, tractors and the like, require that gear changes be made rapidly and with the least possible change in engine speed and vehicle speed in order to conserve the kinetic energy of the vehicle, particularly when climbing hills. The synchronizing clutches in the prior art require large friction surfaces, which require a large space for the synchronizer clutch in order to meet the torque capacity requirements of the clutch. In vehicles equipped with prior art synchronizers, the vehicle operator must apply a large force to the gear shift lever when making gear changes so that gear shifts are made rapidly. Alternatively, if less shifting force is applied, the period for gear engagement is protracted, and the kinetic energy of the vehicle is dissipated.

SUMMARY OF THE INVENTION

It is an object of this invention to provide a synchronizing clutch having multiple conical surfaces for connecting a gear wheel to the synchronizer hub in order to transmit a large inertial torque through the synchronizer.

It is another object of this invention to provide a synchronizing clutch having multiple friction surfaces and high torque capacity in a space whose radial dimension between the gear wheels is a minimum.

In realizing these and other objectives, the synchronizing clutch of this invention includes a first cone member rotatably supported on a gear wheel and free to rotate relative to the gear wheel. A synchronizer hub, rotatably connected to a shaft, carries a synchronizer sleeve on spline teeth at its outer periphery and permits axial displacement of the sleeve into engagement with clutching teeth on the gear wheel while its engagement with the synchronizer hub is maintained. A cone arm assembly extends axially through a slotted web of the synchronizer sleeve and supports members having conical at each of its ends friction surfaces on their inner surfaces. The cone arm assembly is connected to each of the cone members that are supported rotatably on the gear wheels. An intermediate friction member driveably connected to each gear wheel is fitted between the outer and inner cone members.

The clutch sleeve defines an annular space located between radially directed flanges into which space is fitted a detent spring, which is forced radially outward into contact with a recess on the inner surface of the cone arm assembly. The detent spring is maintained in position within the annular space and is carried by the clutch sleeve axially out of the detent recess when the clutch sleeve is moved from the neutral position toward the gear wheel while a gear change is being made. When the clutch sleeve is returned to the neutral position, the spring reseats within the detent recess and maintains the clutch sleeve in its neutral position.

The clutch sleeve defines blocking surfaces that contact mating blocking surfaces on the cone arm assembly. As the clutch sleeve is moved axially by the vehicle operator during a gear change, the cone arm assembly is moved axially bringing the conical surfaces into contact with the mating friction surfaces on the intermediate cone member. This frictional engagement operates to synchronize the speeds of the gear wheel and the clutch hub before the sleeve is moved axially further into mechanical engagement with the clutching teeth on the gear wheel.

BRIEF DESCRIPTION OF THE DRAWING

The figure is a cross section through a diametral plane of a dual cone synchronizing clutch according to this invention.

DESCRIPTION OF THE PREFERRED EMBODIMENT

A shaft 10 of a manual transmission supports gear wheels 12, 14 journalled on its surface and the hub 16 of a synchronizing clutch rotatably connected by splines 18. The outer surface of the hub has multiple axially directed splined teeth 20 engaged by the internal spline teeth 22 of the synchronizer clutch sleeve 24, which is moveable axially with respect to the hub toward the gear wheels and is rotatably connected to the shaft through hub 16. Each gear wheel has clutching teeth 26, 28 located for engagement alternately by the internal spline teeth of the clutch sleeve when the sleeve is moved toward the gear wheels and while it remains engaged with the hub.

The clutch sleeve defines an annular recess 30 located between a radially directed web 32 and a flange 34, wherein an annular, open ended wire spring 36 is fitted. The spring seats within a recess 38 on the inner surface of a cone arm assembly. Arm 40 moves toward the selected gear when the clutch sleeve is moved by the vehicle operator and causes spring 36 to move radially inward out of recess 38 and into contact with the inner surface 42 of the arm. When the sleeve is returned to the neutral position between the gear wheels, spring 36 moves resiliently, radially outward and reseats within recess 38, thereby providing a detent function.

Each axial end of cone arm 40 carries a cone element 44, 46 adapted to engage an intermediate conical friction shoe 48, 50, which is connected to the associated gear wheel engagement by tabs 52, 54. The intermediate conical elements 48, 50 carry on their exterior and interior surfaces friction pads 56, 58. Journalled rotatably on a cylindrical surface of each gear wheel is an internal cone element 60, 62, which is rotatably connected by tabs 64, 66 to the end of cone arm 40.

In operation, when an axially directed force is applied to the synchronizer sleeve 24 by movement of the shift fork under the control of the vehicle operator, a blocking surface on the cone arm assembly contacts a blocking surface on the clutch sleeve and moves the cone elements 44 or 46 into contact with the intermediate friction shoes 48 or 50, respectively. A force develops on the face of the friction shoe tending to force the shoe into contact with the outer surface of cone element 60 or 62. A friction force develops on the inner friction pad 58 as well as on the outer friction pad 56. The friction component of the normal force applied to the friction pads by the rotating conical elements operates to synchronize the speed of the gear wheel with the speed of the shaft. In this configuration, the torque applied to the gear wheel in order to synchronize its speed with that of the shaft is approximately twice the torque that could be developed with one frictional surface operating to develop the torque.

Having described the preferred embodiment of my invention, what I claim and desire to secure to U.S. Letters Patent is:

1. A synchronizing clutch for driveably connecting a rotatably supported member to a shaft comprising:
   clutching teeth fixed to the rotatably supported member;
   a cone element having a conical outer surface mounted on the rotatably supported member for rotation relative thereto;
   a hub rotatably and displaceably fixed to the shaft, located adjacent the rotatably supported member and having a set of spline teeth;
   a clutch sleeve displaceably mounted on the hub for movement into engagement with the clutching teeth, having spline teeth engaged with the spline teeth of the hub and a blocking surface;
   a cone arm assembly including a conical inner surface, a blocking surface adapted to contact the blocking surface of the clutch sleeve as the clutch sleeve is moved axially toward the rotatably supported member, a recess located on the radially inner surface facing the clutch sleeve, the cone arm being rotatably connected to the cone element and axially displaceable with respect to the cone element;
   an intermediate clutching element rotatably fixed to the rotatably supported member, located between the conical inner surface of the cone arm and the conical outer surface of the cone element having outer and inner surfaces adapted for frictional engagement respectively with said conical surfaces; and
   spring means for releasably connecting the clutch sleeve and the cone arm assembly for axial movement with the clutch sleeve and seatable in the recess of the cone arm assembly.

2. The clutch of claim 1 wherein the cone element includes a slot adjacent an end of the cone arm assembly, the cone arm assembly includes a tab fitted within the slot of the cone element, whereby the cone arm assembly and cone element are rotatably connected to one another and axially displaceable with respect to one another.

3. The clutch of claim 1 wherein the rotatably supported member includes a slot adjacent an end of the cone arm assembly, the clutching element includes a tab fitted within the slot of the rotatably supported member, whereby the clutching element and rotatably supported member are rotatably fixed to one another and axially displaceable with respect to one another.

4. The clutch of claim 1 wherein the conical outer surface of the cone element, the conical inner surface of the cone arm assembly and the inner and outer surfaces of the clutching element are substantially mutually parallel.

5. The clutch of claim 1 wherein the clutch sleeve has a radial web having a slot therethrough, the web having a blocking surface located at each axially opposite side thereof, and the cone arm passes through the slot in the radial web, whereby the blocking surface of the clutch sleeve contacts the blocking surface of the cone arm and moves the conical inner surface of the cone arm against the outer surface of the clutching element, and the conical outer surface of the cone element moves against the inner surface of the clutching element.

* * * * *